(12) United States Patent
Tschuor et al.

(10) Patent No.: US 8,516,823 B2
(45) Date of Patent: Aug. 27, 2013

(54) GAS TURBINE WITH WELDED COMBUSTOR LINERS

(75) Inventors: Remigi Tschuor, Windisch (CH); Lothar Schneider, Untersiggeuthal (CH); Alen Markovic, Karlovac (HR); Harmut Hähnle, Küssaberg (DE)

(73) Assignee: ALSTOM Technology Ltd., Baden (CH)

( * ) Notice: Subject to any disclaimer, the term of this patent is extended or adjusted under 35 U.S.C. 154(b) by 286 days.

(21) Appl. No.: 12/724,550

(22) Filed: Mar. 16, 2010

(65) Prior Publication Data
US 2010/0205973 A1 Aug. 19, 2010

Related U.S. Application Data

(63) Continuation of application No. PCT/EP2008/062407, filed on Sep. 18, 2008.

(30) Foreign Application Priority Data

Sep. 24, 2007 (EP) .................................... 07117070

(51) Int. Cl.
*F02C 3/14* (2006.01)
(52) U.S. Cl.
USPC .................................. 60/752; 60/754; 60/796
(58) Field of Classification Search
USPC ................... 60/752, 796, 798–800, 754, 755, 60/757
See application file for complete search history.

(56) References Cited

U.S. PATENT DOCUMENTS

| 2,988,886 | A | * | 6/1961 | Hamm et al. | 60/752 |
| 4,485,630 | A | * | 12/1984 | Kenworthy | 60/757 |
| 4,642,993 | A | * | 2/1987 | Sweet | 60/752 |
| 5,279,127 | A | * | 1/1994 | Napoli | 60/754 |
| 6,434,821 | B1 | * | 8/2002 | Nelson et al. | 29/888.01 |
| 6,901,758 | B2 | * | 6/2005 | Grady et al. | 60/752 |

(Continued)

FOREIGN PATENT DOCUMENTS

| DE | 10116452 | 4/2002 |
| DE | 102007001835 | 8/2007 |

(Continued)

OTHER PUBLICATIONS

Search Report for EP Patent App. No. 07117070.8 (Feb. 28, 2008).

*Primary Examiner* — Andrew Nguyen
(74) *Attorney, Agent, or Firm* — Cermak Nakajima LLP; Adam J. Cermak

(57) ABSTRACT

In order to provide an annular combustion chamber (3) which can be heated without thermal distortion, expands without distortion, and is reliably closed, and for repairs can be opened and permanently closed again and can be reconditioned, the inner and/or outer shell (8, 7) of an annular combustion chamber (3) is produced from a rotationally symmetrical sheet metal. For assembly, the shells are cut open along a split line (16), and the lower half of the inner and of the outer shell (8, 7) is introduced into the lower casing half of a gas turbine. After the insertion of the rotor, the two upper shell halves can likewise be inserted and be connected to the lower halves by welding. In order to improve the service life of the split line weld seam (21), film cooling of the weld seam is routed by an indentation. This may be implemented, for example, by welded-in split line elements (15) which are also suitable for retrofitting.

9 Claims, 5 Drawing Sheets

(56) References Cited

U.S. PATENT DOCUMENTS

2004/0020212 A1   2/2004   Hirota et al.
2007/0180828 A1*  8/2007   Webb ............................ 60/752

FOREIGN PATENT DOCUMENTS

| | | |
|---|---|---|
| DE | 102006011248 | 9/2007 |
| EP | 1267127 | 12/2002 |
| EP | 1312865 | 5/2003 |
| EP | 1426687 | 6/2004 |
| EP | 1813867 | 8/2007 |
| GB | 2131540 | 6/1984 |
| JP | 2002295268 | 10/2002 |
| JP | 2007-107541 * | 4/2007 |
| WO | WO2009/040286 | 4/2009 |

* cited by examiner

GAS TURBINE WITH WELDED COMBUSTOR LINERS

This application is a Continuation of, and claims priority under 35 U.S.C. §120 to, International application PCT/EP2008/062407, filed 18 Sep. 2008, and claims priority therethrough under 35 U.S.C. §§119, 365 to European application No. 07117070.8, filed 24 Sep. 2007, the entireties of which are incorporated by reference herein.

BACKGROUND

1. Field of Endeavor

The invention relates to a gas turbine with annular inner and outer shells of an annular combustion chamber, to the closure of the shell segments, and to a method for repairing this closure.

2. Brief Description of the Related Art

There are basically several different approaches for designing gas turbine combustion chambers. One of these is to use annular combustion chambers, and the present invention relates to this. These are annular combustion chambers which are arranged between the compressor and turbine essentially rotationally symmetrically around the rotor of the gas turbine. A combustible gas mixture is introduced via at least one burner into the annular combustion chamber, burns in the latter and flows as an annular stream into the turbine. The essentially annular space is delimited inwardly, that is to say toward the rotor side, by what is known as an inner shell, and is delimited outwardly by what is known as an outer shell. On account of the high temperatures and the generation of heat in the combustion chamber, the shells are exposed to high thermal loads. In order to ensure a sufficient service life in spite of the high heat load, annular combustion chambers having various cooling methods have been developed, which, moreover, are mostly combined with heat protection layers or protective shields.

EP 1312865 proposes an annular combustion chamber which is constructed from shells and the shells of which are connected to one another via flange-like connection regions.

Shells or half shells connected by flanges have the inherent problem that the regions of the parting lines behave differently in thermal terms from the free shell regions without a flange, and therefore the thermal expansions are different from those in the free wall region. This may lead to distortion particularly in the case of thin-walled shells. A distortion of the shells may vary the height of the cooling ducts located on the shell side facing away from the hot gas and consequently may influence the routing of the cooling air and the cooling efficiency. Moreover, the distortion may lead to stresses, crack formation, or mechanical failure of the parts.

In spite of the cooling and of the heat protection layers, the walls of the combustion chamber which face the combustion chamber inside are parts in which the service life is critical. So as not to have to exchange the entire parts if these critical parts are damaged, various repair methods have been developed. EP 1267127 describes repair methods for the exchange of combustion chamber segments, in particular of shells. In this case, the cutting out of portions of the combustion chamber walls and their replacement and also the welding in of replacement pieces are described.

One disadvantage of welding repairs is that the material properties in the region of the weld seam are usually reduced. In addition, there is the problem of applying high-quality heat protection layers to a weld seam. This applies particularly to repairs which are carried out on the spot, that is to say, in the power station, without good access to the components and without optimal boundary conditions for applying the protective layers. The result of this is that, after the repair has taken place, weld seams constitute a weak point in the continual operation of the gas turbine and often no longer achieve the desired service life. Moreover, the application of a high-quality permanent heat protection layer (Thermal Barrier Coating, TBC) leads to high additional costs and time delays in the repair.

SUMMARY

One of numerous aspects of the present invention includes an annular combustion chamber which can be heated with low distortion in thermal terms, expands with low distortion, and is closed reliably. Moreover, another aspect includes methods by which, without any losses of service life, the annular combustion chamber can be opened for repairs and closed again and can also be reconditioned.

Another aspect includes that the annular inner and outer shell of an annular combustion chamber are formed of rotationally symmetrically produced sheet metal. These are cut open along the split line of the gas turbine for assembly and, in the installed state, are welded together in the split line by at least one split line weld seam. The advantage of using a weld seam is that the shells can be manufactured from sheet metal without reinforcements and the associated inhomogeneities in the heat capacity of the various shell regions. In particular, distortion and stresses in the region of flanges can thereby be avoided. By flanges being avoided, the entire shell can be manufactured from relatively thin sheet metal and therefore the material consumption can be reduced. Since the combustion chamber shells are thermally highly loaded components formed of costly materials, appreciable costs are saved as a result of this reduction. Furthermore, it is difficult to seal off flange connections in the hot gas region reliably, and uncontrolled leakages in the combustion chamber region lead to losses of power and of efficiency. Furthermore, however, they may, above all, have an adverse influence on combustion. In particular, they may lead to pulsations and significantly increased emissions, primarily increased CO and UHC (unburned hydrocarbon) emissions which arise due to "quenching", that is to say, local cooling, of the flame. Secondly, however, an increase in the NOx emissions may also occur, since the local temperature reduction due to leakages is accompanied, if the average combustion chamber outlet temperature is unchanged, by an increase in the local temperature maxima which lead to increased NOx emission. Solutions embodying principles of the present invention with a weld seam can solve the sealing problem and consequently prevent uncontrolled leakages.

In order to ensure the service life of the at least one split line weld seam, a film cooling of the split line weld seam is proposed. To implement film cooling, the shell sheet is provided along the split line weld seam with cooling air holes. These may be provided on one or on both sides of the weld seam. They may be applied by suitable methods, such as, for example, EDM (Electrical Discharge Machining), drilling, etching, or by laser.

In order to increase the effectiveness of film cooling, the shells may be provided in the region of the split line weld seam with an indentation which points away from the hot gas side and points toward the cooling air side. The split line weld seam is formed at the bottom of the indentation, and the holes for film cooling are formed, for example, on the side walls of the indentation. In the simplest version, an indentation is to be understood as meaning a sequence of three bends in the sheet. The first bend and the third bend point away from the annular surface of the inner or the outer shell from the hot gases. The second bend is oriented opposite to the first and the third bend and connects the two ends, pointing away from the hot gases, of the first and the third bend in an arc. The center of this connecting arc is that region of the indentation which is furthest away from the hot gases. It is designated below as the bottom of the indentation.

So that the film cooling is influenced as little as possible by the main flow, the indentation may be formed parallel to the main flow. This will arise, as a rule, when the indentation is formed in the split line and parallel to this.

To improve the heat resistance, the shells are each coated with a heat protection layer on the side facing the hot gases.

These annular shells may be brought to the desired shape by plastic deformation, for example in a rotary method (spinning) or by explosion forming. In order to improve the dimensional stability, particularly also for further machining, the shells may be annealed, free of stress, before being divided into an upper and a lower half shell.

For installation or exchange, the shells are cut open along a split line, and the lower half of the inner and of the outer shell is introduced into the lower casing half of a gas turbine. After the insertion of the rotor, the shaft cover, etc., the two upper shell halves can likewise be inserted and be connected to the lower halves by welding. After the welding of the shell halves, annular shells are again formed, which are free of flanges or other thickenings which may lead to a thermal distortion.

On the side facing away from the hot combustion gases, the inner and the outer shell are cooled by cooling air or another suitable medium. In order to ensure effective cooling, the cooling medium is routed, for example in a cooling air guide sleeve, along the surface of the shell. A cooling air guide sleeve is a sheet metal structure which is held at a defined distance from the shell sheet by spacers and below which the cooling medium flows along. Fastening to the shell ensures that the distance between the cooling air guide sleeve and the shell remains constant even in the event of thermal expansions of the shell.

The distance between the cooling air guide sleeve and the shell may in this case vary locally. In regions which demand a high cooling power, the distance may be reduced, in order to increase the flow velocity and, consequently, the heat transmission. Further, the cooling air side of the shells may be provided with turbulence ribs in order to increase heat transmission.

A further possibility for reducing the temperature of the weld seam is to provide it locally with impingement cooling. This is possible alone or in combination with measures described above. By the impingement cooling, the heat transmission is increased and consequently the temperature gradient of the material is increased, which may be detrimental to the cyclic service life. Depending on the load on the component, therefore, impingement cooling can be employed only in combination with film cooling or locally. In many instances, impingement cooling is disregarded entirely.

In principle, the shell sheet is plastically deformable, so that an indentation is possible by pressing, form drawing, or another suitable process before the originally annular inner and outer shells are separated and divided into two half shells. Further, it is possible for the half shell margins to be bent up after separation into two half shells. The plastic deformation of the shell sheets is complicated on account of the overall size of the parts and may lead to a distortion of the parts.

As an alternative solution in which the plastic deformation of entire shells or half shells is avoided, according to principles of the present invention a version with at least one split line element is proposed. In this version, in the split line region, an elongate sheet metal strip is cut out from the annular inner and/or outer shell, and a split line element is fitted into the gap which occurs and is welded in.

Split line elements are sheet metal strips which follow the contour of the shells in the split line and which, moreover, are provided with a suitable indentation for a weld seam and for routing the film cooling. These are produced from sheet metal by plastic deformation, for example by pressing. Holes for film cooling are to be provided on at least one side wall of the indentations. These holes may be applied by suitable methods, such as, for example, EDM (Electrical Discharge Machining), drilling, etching, or by laser.

The cooling film or the cooling air holes and cooling air supply can be controlled, by action on the material temperature, such that the service life of the shell is optimized.

To insert the split line elements, strips of corresponding size are cut out from the shells in the region of the split line, the split line elements are adapted and are welded in. The insertion of the split line element is carried out in a factory or a workshop. Correspondingly, for insertion of the split line element, the weld seams are easily accessible and, if necessary, can be welded from both sides. Above all, the weld seams are accessible for coating with a heat protection layer. Coating is carried out, for example for the entire shell, only after the insertion of the split line element.

When a split line element is used, its selected sheet thickness may be equal to the sheet thickness of the remaining shell sheet. However, a different sheet thickness may be advantageous. For example, the selected sheet thickness of the split line element may be greater than that of the shell sheet, in order to ensure the mechanical stability of the split line element in spite of cooling air bores. On the other hand, the split line element may be designed with a smaller sheet thickness, in order to avoid a distortion of the shells due to the stiffening effect of the indentation of the split line element.

If a split line element is used, various further possibilities for optimizing this cooling technique are afforded. For example, the indentation may be provided in the form of a dovetail, so that the area open to the hot gas side is reduced and the cooling air requirement for film cooling is reduced. In this instance, in manufacturing terms, it may be simpler to produce the split line element from two parts which are welded together in the bottom of the dovetail which later serves as a split line.

On account of the flow conditions and the temperature distribution on the hot gas side, it is possible that only part of the split line and, in particular, only part of the weld seam for closing the split line are critical in terms of service life. In this case, the use of the above-described measures for improving the service life of the weld seam, in particular the insertion of a split line element, may be restricted to the critical region of the split line.

The installation or exchange of inner and/or outer shells having split line elements takes place in a similar way to the method already explained for inner and/or outer shells without split line elements. That is to say, for installation or exchange, the inner and/or outer shell are cut open along a split line, and in each case the lower half is introduced into the lower casing half of a gas turbine. After insertion of the rotor, the shaft cover, etc., the upper shell halves can likewise be inserted and be connected to the lower halves by welding.

So that the split line elements are suitable not only for first installation, it may be advantageous to manufacture these with lateral oversize and to cut them to size correspondingly when they are being fitted into the shell. In particular, if oversized split line elements are used, during each exchange the existing weld seams, which usually have poorer material properties than the base material, may be cut away. Consequently, during each exchange, the width of the elongate cut-out sheet metal strip becomes greater and, during each exchange, less residual material is cut off from the split line element manufactured with oversize.

A further advantage of the solution is that the split line elements can be installed even in existing shells as a repair solution. These ensure that, after reconditioning (overhauling), when combustion chamber shells are reinstalled the service life can be achieved even in the region of the split line weld seam.

In addition to a gas turbine with annular shells and with a welded closure, another aspect includes a method for opening and closing the shells.

BRIEF DESCRIPTION OF THE DRAWINGS

The invention is illustrated by reference to exemplary embodiments in FIGS. 1 to 5c, in which.

DETAILED DESCRIPTION OF EXEMPLARY EMBODIMENTS

A gas turbine with a device for carrying out the method according to principles of the present invention has essentially at least one compressor, at least one combustion chamber, and at least one turbine which drives the compressor and a generator via at least one shaft.

Figure 1:
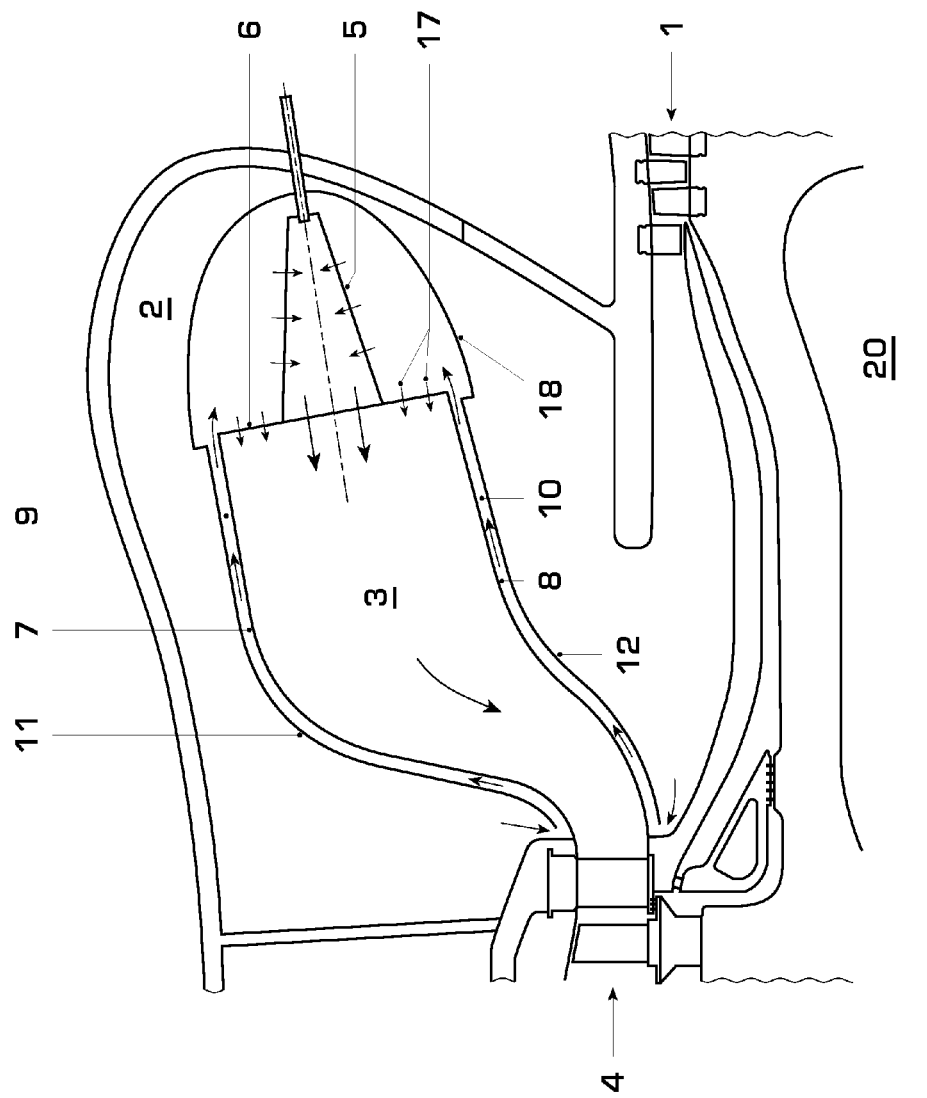
FIG. 1 shows a section through the middle portion of a gas turbine with an annular combustion chamber.

FIG. 1 shows a section through the middle portion of a gas turbine, that is to say, the region between the compressor and turbine and also the output stage of the compressor and the first stage of the turbine.

The compressor 1 compresses the air. The largest part of the air is introduced via the compressor plenum 2 into an annular combustion chamber 3 and is intermixed with fuel which burns there. The hot combustion gases flow from there through a turbine 4, while at the same time performing work. The annular combustion chamber is surrounded by an outer shell 7, an inner shell 8, and a front plate 6 through which the fuel premixed with compressor output air is introduced via burners 5. Part of the compressor output air, before being introduced into the annular combustion chamber, is conducted along the inner shell 8 and outer shell 7 for cooling. An outer cooling air guide sleeve 11 and an inner cooling air guide sleeve 12 are provided around the combustion chamber shells for routing the cooling air. In order to generate a pressure difference which causes the cooling air to flow along between the cooling air guide sleeve and the combustion chamber shell, at the outlet of the cooling air guide sleeve a burner hood 18 is arranged in which a pressure lying below the compressor plenum pressure prevails. The air flows from this via the burners 5 or as front plate cooling air 17 into the annular combustion chamber 3. The pressure loss between the compressor plenum 2 and the annular combustion chamber 3 is consequently divided into a part for combustion shell cooling and a part for front plate cooling or admixing to the burners 5.

Figure 2:
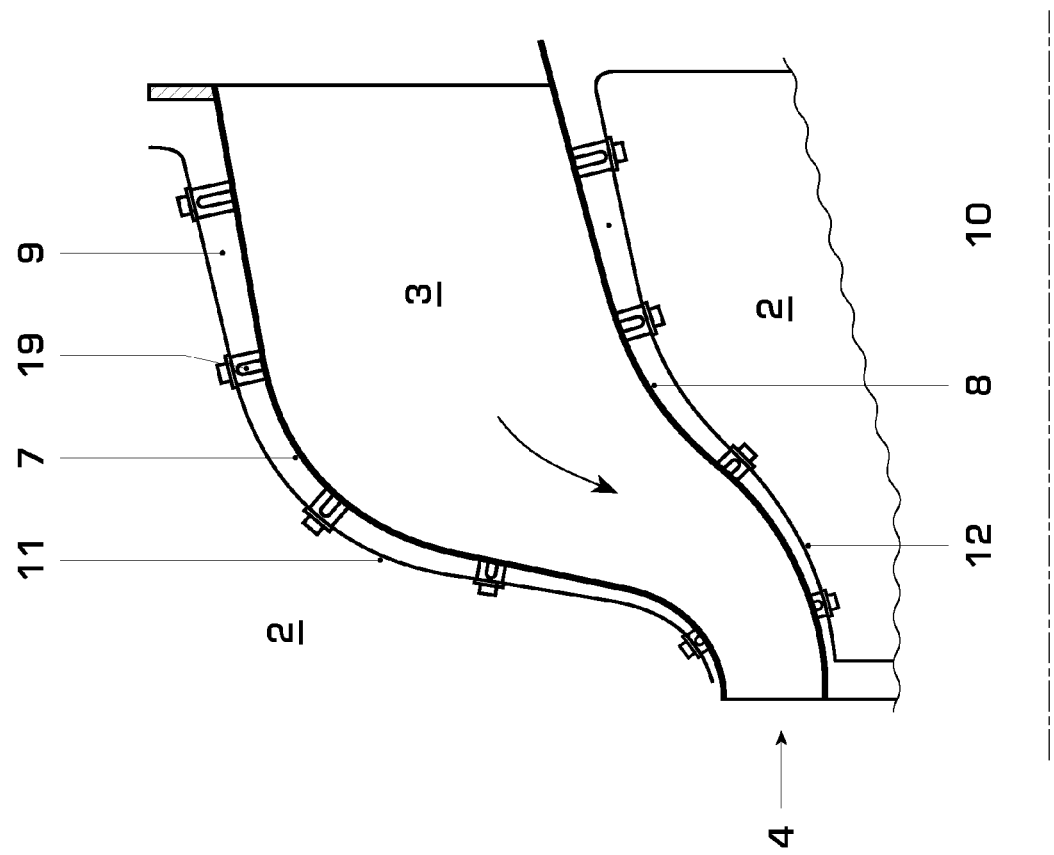
FIG. 2 shows a section through the annular combustion chamber of a gas turbine with an inner and an outer shell and with cooling air guide sleeves for routing the shell cooling air.

FIG. 2 shows a section through the annular combustion chamber 3 of a gas turbine with an inner 8 and an outer 7 shell and with cooling air guide sleeves 11, 12 for routing the shell cooling air. Further, the fastening elements 19, by which the inner cooling air guide sleeve 12 is connected to the inner shell 8 and the outer cooling air guide sleeve 11 is connected to the outer shell 7, are illustrated. The burners and front plate are not shown here.

Figure 3:
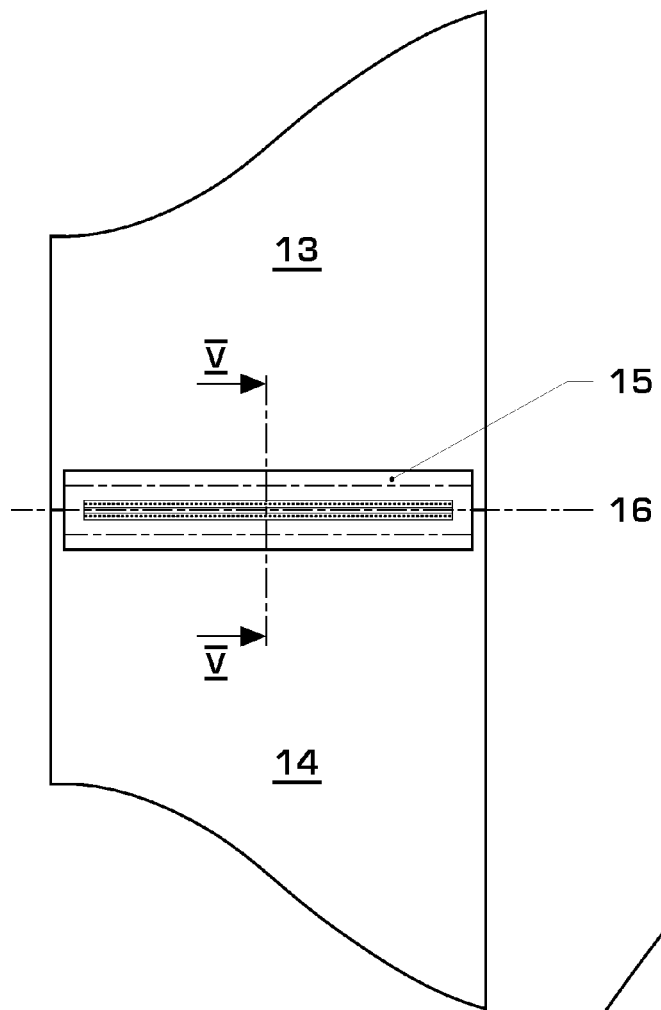
FIG. 3 shows a side view of a combustion chamber shell with a split line element.
Figure 4:
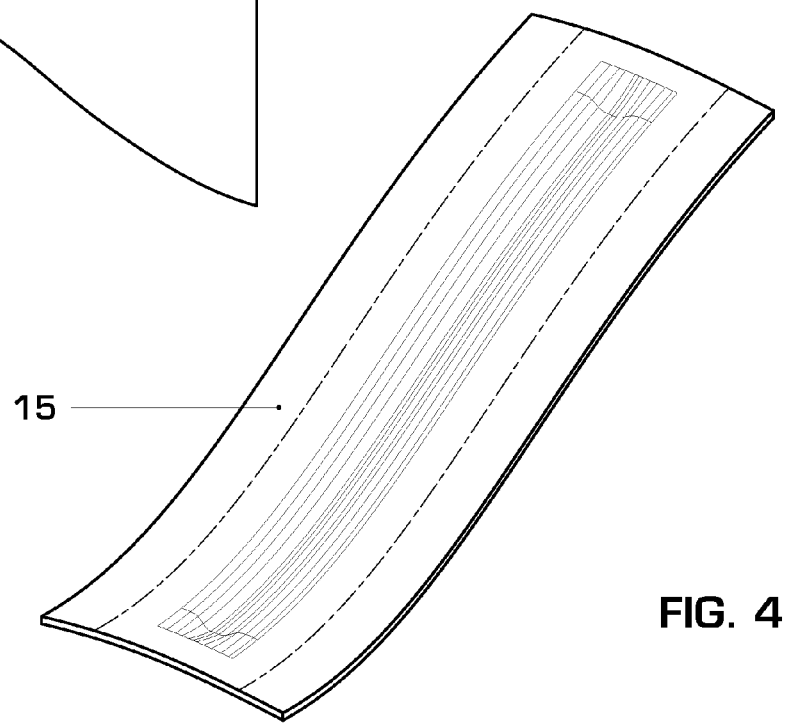
FIG. 4 shows a three-dimensional illustration of a split line element with oversize at the sides.

FIG. 3 shows a side view of an annular combustion chamber shell with a welded-in split line element 15. The combustion chamber shell, illustrated by way of example, may be both an inner shell 8 and an outer shell 7. The combustion chamber shell is formed symmetrically from sheet metal in a rotary method. Subsequently, a sheet metal strip is cut out in the split line 16, with the result that the shell can be separated into an upper and a lower half 13, 14. The upper and the lower halves 13, 14 may, however, also still remain connected at the end regions, as illustrated in FIG. 3, and an essentially rectangular gap may be cut out only in the middle region. A split line element 15 is fitted into this gap and welded in. A split line element 15 of this type is illustrated 3-dimensionally in FIG. 4. These elements are produced, for example, with oversize and, when being fitted in, are then cut to the required size. They are produced from sheet metal by plastic deformation, for example by pressing. To improve heat resistance, a heat protection layer is applied on the side facing the hot gas. This may be, for example, a zirconium oxide with an accompanying adhesive layer (bond coat).

For assembly, the shells are cut open along a split line, and the lower half of the inner and of the outer shell is introduced into the lower casing half of a gas turbine. After the insertion of the rotor, the shaft cover, etc., the two upper shell halves can likewise be inserted and be connected to the lower halves by welding. This gives rise again to annular shells.

Figure 5A:
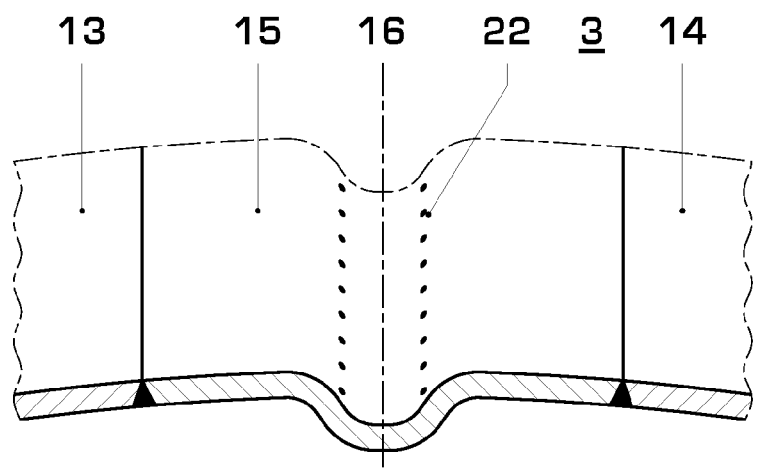
FIG. 5a shows a section V-V through a split line element welded into a shell, before installation in a gas turbine.

The holes provided on at least one side wall of the indentations for film cooling may be applied by suitable methods, such as, for example, EDM (Electrical Discharge Machining), drilling, etching, or by laser. A version with two rows of cooling air holes 22 on both sides of the split line 16 is shown in the section V-V in FIG. 5a for a split line element 15 welded into a shell, before installation in a gas turbine. The indentation points away from the hot gases, that is to say from the annular combustion chamber 3. The split line 16 is located in the bottom of the indentation.

Figure 5B:
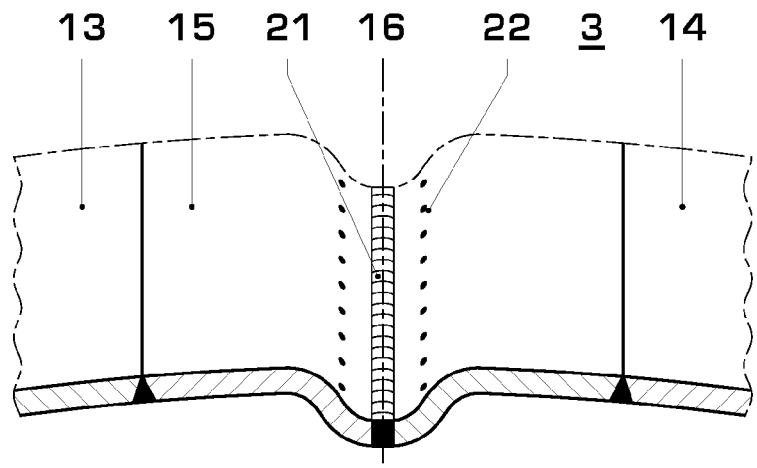
FIG. 5b shows a section V-V through a split line element welded into a shell, with a split line weld seam, after installation in a gas turbine.

The same split line element 15 is shown in FIG. 5b with a split line weld seam 21 after installation in a gas turbine. The split line weld seam 21 is formed in the split line 16 in the bottom of the indentation.

Figure 5C:
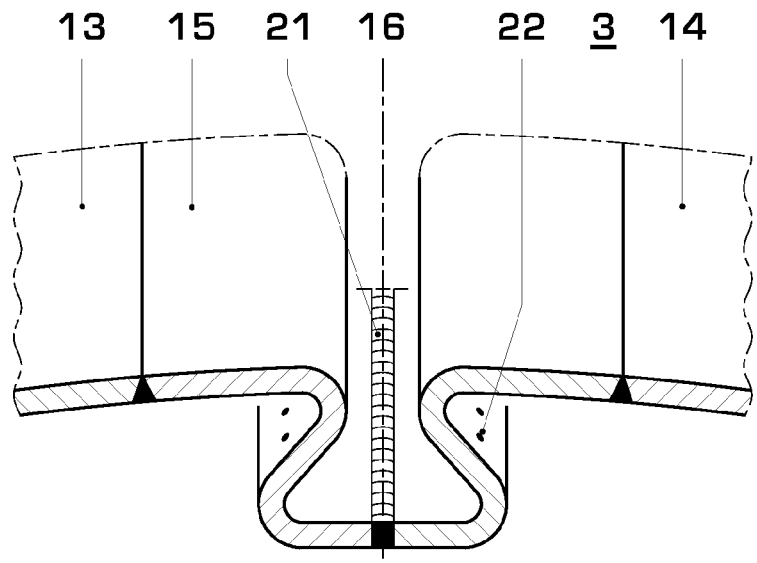
FIG. 5c shows a section V-V through a split line element in the form of a dovetail.
Figure 6:
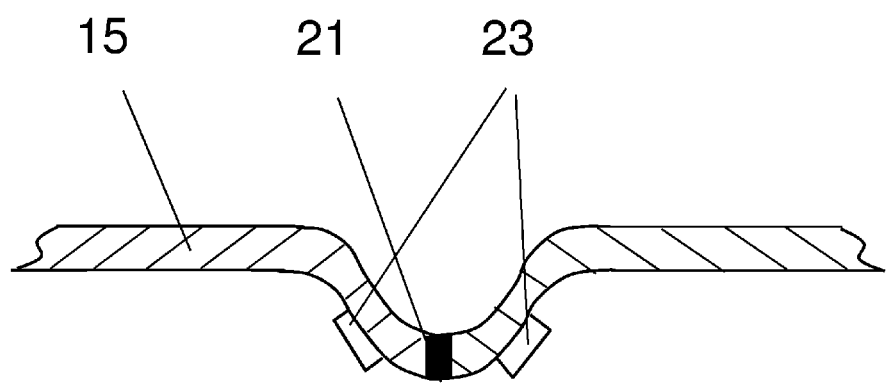
FIG. 6 shows a section V-V through a split line element, including turbulence ribs.

FIG. 5c shows an example of a split line element which is designed in the form of a dovetail. Here, too, the weld seam is formed, for example, along the split line 16 in the bottom of the indentation. In this case, here, the bottom of the indentation is to be understood as meaning not the center of an arc, but, instead, the general indentation region facing furthest away from the hot gases. In the example illustrated, the cooling air holes 22 are arranged in two rows in the side walls of the dovetail such that the cooling air is directed onto the split line weld seam 16. However, the cooling air holes 22 may also be arranged in one row parallel to the split line weld seam 16. Furthermore, the cooling air side of the shells may be provided with turbulence ribs 23 (see FIG. 6) in order to increase heat transmission.

The invention, of course, is not restricted to the versions shown and described here. All the advantages explained can be used not only in the combinations specified in each case, but also in other combinations or alone, without departing from the scope of the invention. For example, it is possible that the inner shell of a combustion chamber is designed according to principles of the present invention and the outer shell of the same combustion chamber is designed with a flange.

LIST OF REFERENCE SYMBOLS

1 Compressor (only the last two stages illustrated)
2 Compressor plenum
3 Annular combustion chamber
4 Turbine (only the first stage illustrated)
5 Burner
6 Front plate
7 Outer shell
8 Inner shell
9 Outer cooling duct
10 Inner cooling duct
11 Outer cooling air guide sleeve
12 Inner cooling air guide sleeve
13 Upper shell half of the inner or outer shell
14 Lower shell half of the inner or outer shell
15 Split line element
16 Split line
17 Front plate cooling air
18 Burner hood
19 Fastening elements
20 Shaft
21 Split line weld seam
22 Cooling air holes
23 turbulence ribs While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A gas turbine comprising:
   at least one annular combustion chamber comprising an annular inner shell and an annular outer shell, each shell being formed of sheet metal and having a split line which splits each shell into an upper half shell and a lower half shell;
   wherein the inner shell is, the outer shell is, or both shells are closed in the split line by at least one split line weld seam; and
   cooling holes in the inner shell, the outer shell, or both, along the at least one split line weld seam, the cooling holes being configured and arranged to film-cool at least part of the at least one split line weld seam;
   wherein at least one of the inner and outer shells comprises an indentation having three bends in said sheet metal, the at least one split line weld seam and the cooling holes being formed in the indentation, the indentation having a bottom pointing away from the hot gas side of the at least one annular combustion chamber, the bottom being directly exposed to hot gases in the combustion chamber, the indentation configured and arranged to guide a cooling air film along the split line weld seam; and
   wherein the bottom of the indentation extends lengthwise parallel to the main flow of the at least one annular combustion chamber.

2. A gas turbine as claimed in claim 1, further comprising a heat protection layer coated on the hot gas side of at least one of the inner shell and the outer shell.

3. A gas turbine as claimed in claim 1, wherein the cooling side of the at least one annular combustion chamber further comprises turbulence ribs in the region of the split line weld seam configured and arranged to cool the split line weld seam.

4. A gas turbine as claimed in claim 1, further comprising: impingement cooling holes configured and arranged to cool the at least one split line weld seam.

5. A gas turbine as claimed in claim 1, further comprising: a split line element having the indentation which points away from the hot gas side of the at least one annular combustion chamber and which guides cooling air film along the split line weld seam, the split line element being welded into at least one of the inner shell and the outer shell in the region of the split line.

6. A gas turbine as claimed in claim 5, wherein the split line element has a wall thickness which is different from that of said at least one of the inner shell and outer shell.

7. A gas turbine as claimed in claim 5, wherein the indentation has a dovetail shape.

8. A gas turbine as claimed in claim 1, wherein the at least one split line weld seam is arranged at the bottom of the indentation.

9. A gas turbine as claimed in claim 1, wherein the three bends comprise first, second, and third bends, the first bend and the third bend pointing away from the hot gas side of the annular surface of the inner or the outer shell, and the second bend being oriented opposite to the first bend and the third bend and connecting two ends of the first end and the third end, pointing toward the hot gas side forming an arc between the first bend and the third bend.

* * * * *